US006516528B1

(12) United States Patent
Choo et al.

(10) Patent No.: US 6,516,528 B1
(45) Date of Patent: Feb. 11, 2003

(54) SYSTEM AND METHOD TO DETERMINE LINE EDGE ROUGHNESS AND/OR LINEWIDTH

(75) Inventors: Bryan K. Choo, Mountain View, CA (US); Bhanwar Singh, Morgan Hill, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/794,712

(22) Filed: Feb. 26, 2001

Related U.S. Application Data

(60) Provisional application No. 60/242,811, filed on Oct. 24, 2000.

(51) Int. Cl.[7] .............................................. G01B 5/20
(52) U.S. Cl. ........................ 33/552; 33/551; 33/553; 33/554; 33/555; 148/33.2; 29/25.01
(58) Field of Search .......................... 33/533, 549, 551, 33/552, 553, 554, 555; 148/33.2; 29/25.01

(56) References Cited

U.S. PATENT DOCUMENTS

| 4,566,192 A | * | 1/1986 | Hankins et al. ............... 33/533 |
| 4,611,408 A | * | 9/1986 | Plante .......................... 33/552 |
| 4,754,555 A | * | 7/1988 | Stillman ....................... 33/533 |
| 5,617,645 A | * | 4/1997 | Wick et al. .................... 33/551 |
| 5,656,182 A | * | 8/1997 | Marchman et al. ............. 430/4 |
| 6,028,305 A | | 2/2000 | Minne et al. |
| 6,047,479 A | * | 4/2000 | Galestien ...................... 33/553 |
| RE36,731 E | * | 6/2000 | Fukuda et al. ................ 355/53 |
| 6,178,653 B1 | * | 1/2001 | Griffith et al. ................ 33/555 |
| 6,209,217 B1 | * | 4/2001 | Tsuruta et al. ................ 33/554 |
| 6,349,755 B1 | * | 2/2002 | Sardo ........................... 33/552 |
| 2002/0084794 A1 | * | 7/2002 | Root ............................ 324/754 |

FOREIGN PATENT DOCUMENTS

| JP | 57010411 | * | 1/1982 | ................ 33/551 |
| JP | 0422548 A2 | * | 4/1991 | ................ 33/555 |
| JP | 04283053 A | * | 10/1992 | ................ 33/551 |

OTHER PUBLICATIONS

"Line Edge Roughness in sub-0.18-μm Resist Patterns", SPIE, vol. 333, pp. 634-642, 1998.
"Resist Edge Roughness with Reducing Pattern Size", SPIE, vol. 3333, pp. 313-323, 1998.

* cited by examiner

Primary Examiner—Diego Gutierrez
Assistant Examiner—Travis Reis
(74) Attorney, Agent, or Firm—Eschweiler & Associates, LLC

(57) ABSTRACT

A system and method are disclosed for determining properties of a feature located at a surface of a substrate. A plurality of probe tips are operable to traverse a surface of the substrate and provide measurement data indicative of topographical features scanned thereby. The measurement data obtained from the plurality of probe tips is aggregated and processed to determine feature properties, such as may include line edge roughness and/or linewidth.

19 Claims, 6 Drawing Sheets

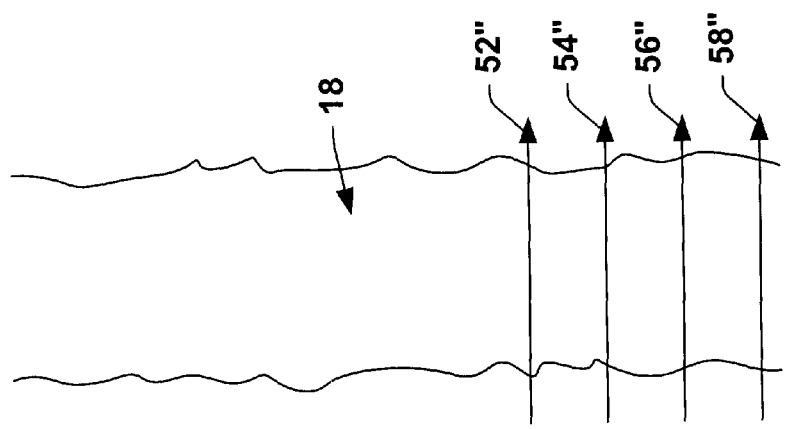
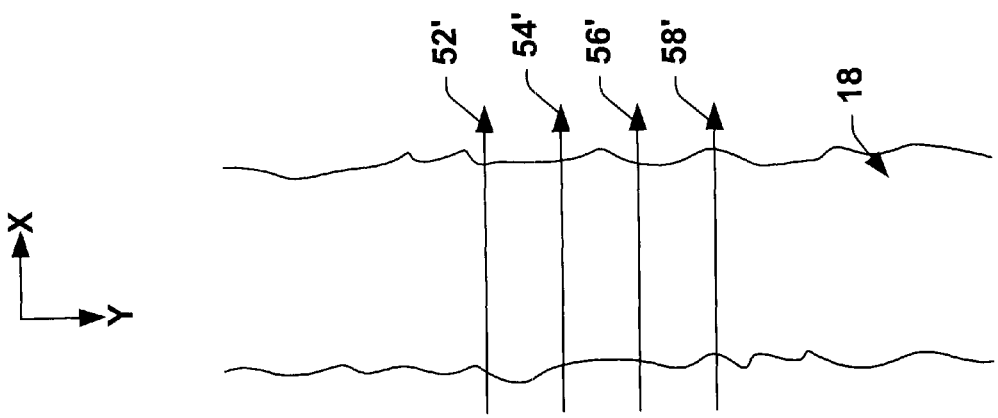
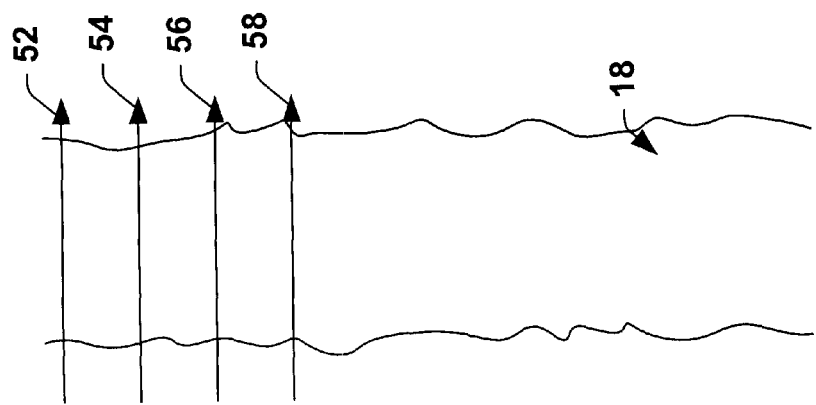

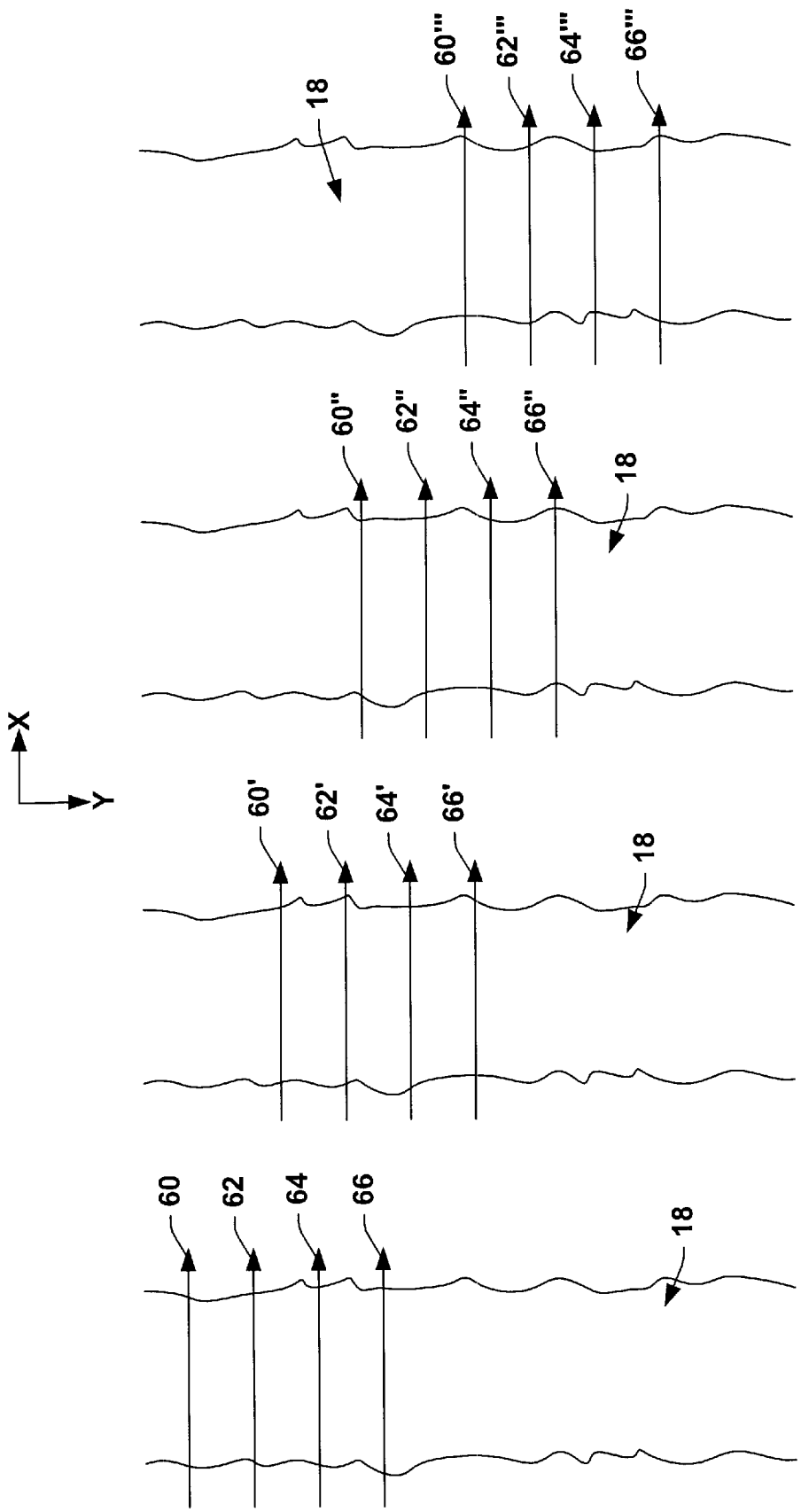

SYSTEM AND METHOD TO DETERMINE LINE EDGE ROUGHNESS AND/OR LINEWIDTH

This application claims the benefit of Provisional Application No. 60/242,811, filed Oct. 24, 2000.

FIELD OF THE INVENTION

The present invention generally relates to semiconductor processing and, more particularly, the present invention relates to a system and method for determining surface properties of a feature on a substrate.

BACKGROUND OF THE INVENTION

In the semiconductor industry, there is a continuing trend toward higher device densities. To achieve these high densities there has been and continues to be efforts toward scaling down the device dimensions on semiconductor wafers (e.g., at submicron levels). In order to accomplish such high device packing density, smaller and smaller features sizes are required. This may include the width and spacing of interconnecting lines, spacing and diameter of contact holes, and the surface geometry such as corners and edges of various features.

The requirement of small features with close spacing between adjacent features requires high resolution photolithographic processes. In general, lithography refers to processes for pattern transfer between various media. It is a technique used for integrated circuit fabrication in which a silicon slice, the wafer, is coated uniformly with a radiation-sensitive film, the resist, and an exposing source (such as optical light, x-rays, etc.) illuminates selected areas of the surface through an intervening master template, the mask, for a particular pattern. The lithographic coating is generally a radiation-sensitive coating suitable for receiving a projected image of the subject pattern. Once the image is projected, it is indelibly formed in the coating. The projected image may be either a negative or a positive image of the subject pattern. Exposure of the coating through a photomask causes the image area to become either more or less soluble (depending on the coating) in a particular solvent developer. The more soluble areas are removed in the developing process to leave the pattern image in the coating as less soluble polymer.

The transfer of patterns to the photoresist layer involves the use of optical aligners. Optical aligners are machines that contain a variety of subsystems that work together to form the imaging function. Such optical aligners include: (1) an illumination source which provides the optical energy (UV light in the above example) for transforming the photoresist via exposure, (2) an optical subsystem that focuses the circuit patterns onto the photoresist surface and allows for controlled exposure times, and (3) a movable stage that holds the wafer being exposed.

The goal of a high performance lithography system is to provide a high resolution, repeatable system which reduces the linewidth of features produced thereby. In addition to providing small, repeatable linewidths, it is also desirable to provide linewidth uniformity across the image field. That is, it is desirable to provide a lithography system in which a designer can expect the linewidth of various features across the image field to fall within a predetermined range of a nominal, target value. As lithography systems and processes continue to improve, the average linewidth variation across the image field continues to decrease, thus indicating greater linewidth uniformity.

It is important for lithography developers to ascertain a linewidth variation across the image field in order to properly characterize and develop new lithography components and processes (e.g., exposure processes, mask materials, photoresists, imaging systems, etc.) to further enhance linewidth uniformity. As feature linewidths and the average linewidth variations associated with features continue to shrink, however, distilling the average linewidth variations that are due to the lithography system from the linewidth variations due to other phenomena becomes increasingly difficult. One such phenomenon is called line edge roughness (LER) and refers to the variations on the sidewalls of patterned features.

LER occurs in patterned features and is caused, for example, by a corresponding LER within an overlying photoresist, which is used as a mask for the patterning of the features. LER in photoresist masks is caused by various factors, including LER on the chrome patterns which reside on the reticle (often called mask edge roughness), the image contrast of the system used in generating the photomask. pattern, the plasma etch with which the photoresist pattern is formed, the photoresist material properties and chemistry and the photoresist processing scheme. The LER in the overlying photoresist mask is then transferred into the underlying film (e.g., metal, polysilicon, etc.). In addition to LER in the photoresist mask, the plasma etch used in patterning the underlying film further contributes to the LER of the patterned feature.

As feature sizes continue to shrink, the contribution of LER to the entire feature linewidth variation becomes more pronounced and thus it is important to separate or distill the LER from average linewidth variations caused by the lithography system and process. With such information, each component that makes up the entire linewidth variation (e.g., LER and the lithography system) can be separately characterized and processes can be developed to reduce each component. When a nominal linewidth is substantially large (e.g., a poor quality lithography process having large linewidth variations), a nonuniformity is relatively small with respect thereto and thus may be effectively ignored. In contrast, as the linewidth dimensions become smaller, a similarly dimensioned nonuniformity becomes more pronounced with respect to the entire linewidth variation and, therefore, should be taken into account. More particularly, it is important for the lithography developer to separate LER from average linewidth variations due to the lithography system and process so that subsequent process development can properly focus on each component of linewidth variation separately. In addition, as device features continue to shrink, LER impacts the process control, for example, causing the channel lengths of various transistors to vary from one another beyond a maximum threshold and thus undesirably resulting in device performance variations. The LER is a significant concern in lithography processes employing an exposure wavelength of 193 nm or less.

SUMMARY

The present invention relates to a system and related method for determining properties of a patterned feature, which may include line edge roughness (LER) and/or linewidth, wherein the patterned feature is scanned by a scanning system having a plurality of probe tips. Data obtained from the plurality of tips is aggregated and processed to quantify selected characteristics of the patterned feature. The quantified characteristics may then be employed to refine the associated lithography processes to mitigate undesirable LER and/or linewidth variations.

One aspect of the present invention provides a system for determining properties of a feature located at a surface of a substrate. The system includes a scanning system having a plurality of probe tips operable to traverse a surface of the substrate. Each probe tip provides measurement data indicative of topographical features scanned thereby. A control system is operable to aggregate measurement data from the plurality of probe tips to determine feature properties based on the aggregated measurement data.

According to another aspect of the invention, the system for determining properties of a feature is operable to determine a line edge roughness of a developed photoresist feature. The invention further comprises a processor and control system associated with the determination system which takes the line edge roughness data associated with the photoresist feature and provides one or more feedback control signals to an exposure system for performing a post developments blanket exposure of the photoresist feature. More particularly, the system is operable to customize the blanket exposure (e.g., temperature and duration) as a function of the determined line edge roughness. The blanket exposure results in a change in the photoresist chemistry resulting in a "pull-back" associated with the edges of the photoresist feature due to surface tension, thereby reducing the line edge roughness associated therewith. The reworked substrate is then available for subsequent processing, as may be desired.

Another aspect of the present invention provides a method for determining properties of a feature located at a surface of a substrate. The method includes employing a plurality of probe tips to scan the surface of the substrate and adjusting the position of the probe tips between consecutive scanning intervals. Measurement data obtained for each probe tip during each scanning interval is stored and the measurement data associated with a feature are aggregated. Feature characteristics are then determined as a function of the aggregated measurement data associated with the feature.

According to another aspect of the present invention, line edge roughness data may be employed to adjust operating characteristics of an associated semiconductor process so as to mitigate line edge roughness.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents.

Other advantages and novel features of the invention will become apparent from the following detailed description of the invention when considered in conjunction with the drawings.

BRIEF DESCRIPTION OF THE DRAWINGS

FIGS. 2A–2C illustrate a first scanning approach that may be implemented in accordance with the present invention;

FIGS. 3A–3D illustrate a second scanning approach that may be implemented in accordance with the present invention;

DETAILED DESCRIPTION OF THE INVENTION

Various aspects of the present invention will now be described with reference to the drawings in which like numbers refer to corresponding parts throughout the various views. The present invention relates to a system and method to determine topographical feature characteristics of a substrate. A plurality of probe tips are employed to scan a substrate over a plurality of scanning intervals to obtain measurement data. The measurement data is aggregated and analyzed to provide information about feature characteristics, such as may include line edge roughness (LER) and/or linewidth. The information then may be utilized to refine process steps so as to mitigate undesirable LER and/or linewidth variations. Alternatively, the information may be employed to rework the analyzed substrate via, for example, a customized blanket exposure step to reduce the LER in the photoresist prior to subsequent processing.

Figure 1:
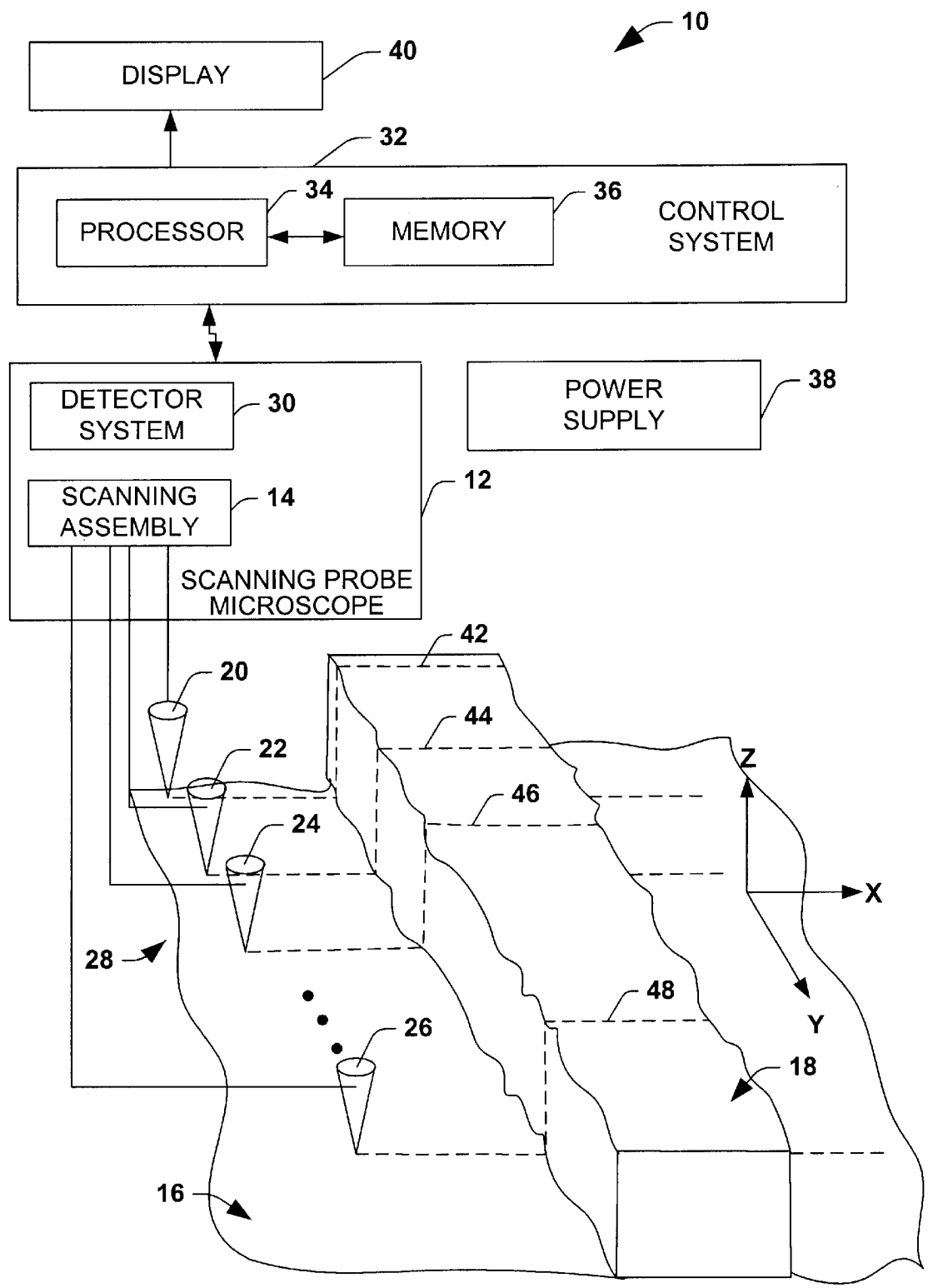
FIG. 1 is schematic representation of a multiple probe scanning system in accordance with the present invention.

Turning now to FIG. 1, a system 10 for measurement and analysis of feature properties, in accordance with an aspect of the present invention, is illustrated. The system 10 includes a scanning probe microscope 12 having a scanning assembly 14 to measure surface properties of a wafer or other substrate 16, which includes one or more features 18 located thereon. The scanning assembly 14 is operatively connected to (or includes) a plurality (e.g., two or more) of anatomically sharp scanning probe tips 20, 22, 24, and 26 for measuring the topography of substrate 16. The probe tips 20, 22, 24, and 26 define a probe assembly 28, which may be a substantially linear array of probe tips. Typically, each probe tip 20, 22, 24, 26 extends from a respective cantilever (not shown) generally toward the surface of the substrate 16. Each probe tip 20, 22, 24, 26 is brought very close and/or may contact the surface of the substrate 16 being analyzed, as the probe tips scan across the surface thereof.

For purposes of brevity, the associated cantilever structures are not shown in FIG. 1, as any type or configuration of cantilever may be utilized in accordance with an aspect of the present invention. A cantilever associated each of the probe tips 20, 22, 24, 26 may be operatively connected to a common support structure, such as a scanning arm, to facilitate synchronous scanning by the probe tips. While, for purposes of illustration, the probe tips 20, 22, 24, and 26 are illustrated as being substantially conical, those skilled in the art will understand and appreciate that other shapes and configurations of probe tips may be utilized in accordance with the present invention. Moreover, selected probe tips 20, 22, 24, and 26 may be configured differently. While four probe tips 20, 22, 24, and 26 are illustrated in FIG. 1, it is to be appreciated that any plurality of probe tips (e.g., two or more) could be implemented in accordance with the present invention.

The scanning probe microscope 12 includes a detector system 30 for detecting movement of each of the probe tips 20, 22, 24, 26 relative to the substrate 16, which movement corresponds to surface characteristics of the substrate. The surface characteristics may include the critical dimensions, feature boundaries, defects in the feature 18, etc. By way of example, each probe tip 20, 22, 24, 26 is adapted to move substantially up or down (e.g., in the Z-direction) commensurate with the surface characteristics of the substrate 16 as the substrate is scanned. The detection system 30 detects the movement of each tip 20, 22, 24, 26 to provide measurement data that is passed to a control system 32. The measurement data indicates the surface properties of the substrate and features patterned thereon. As set forth below, the measurement data further may be utilized to quantify LER information and/or linewidth information in accordance with an aspect of the present invention.

The detection system 30 may employ any type of sensing mechanism to detect movement of each probe tip 20, 22, 24, 26. For example, an optical detection scheme may be utilized, in which a beam of light (e.g., a laser beam) is reflected or diffracted by the tip or cantilever an amount proportional to the movement of each tip. The beam may be detected at a photodetector that provides an output signal indicative of the detected movement of each probe tip. A similar optical detector system may be utilized for each probe tip. Alternatively, a cantilever associated with each probe tip may be coupled to and/or include a piezoelectric sensor for providing a signal indicative of movement of an associated probe tip relative to the cantilever in response to movement of the tip relative to the substrate 16. The detector signals are provided to the control system 32. In addition, the detector system 30 and/or the control system 32 may provide amplification, filtering or other signal processing of the received signal for each probe tip 20, 22, 24, 26.

The control system 32 includes a processor 34, which is programmed to control operation of the various components within the system 10 in order to carry out the various functions described herein. It is to be appreciated that a plurality of processors and/or processing systems may be included as part of and/or external to the system for performing signal analysis in accordance with the present invention.

A memory 36 is operatively coupled to the processor 34 for storing computer-executable instructions, which may be executed by the processor for carrying out operating functions of the system 10 as described herein. The memory 36 may include, for example, read only memory (ROM) and random access memory (RAM). The RAM is the main memory into which the operating system and application programs are loaded. The memory 36 also may serve as a storage medium for temporarily storing information such as the measurement data (e.g., amplitude and tip position relative to the substrate surface), substrate position, curve fitting data, statistical data, programs for determining feature properties from measurement data, and other data which may be employed in carrying out the present invention. For mass data storage, the memory may also include a hard disk or other large nonvolatile storage medium.

A power source 38 provides operating power to the system 10, including its various component parts. Any suitable power source (e.g., battery, line power) may be employed in connection with the present invention. The system also may include a display 40 for displaying an image constructed based on the measurement data.

The control system 32, more particularly, the processor 34 is operable to control the scanning of the tips 20, 22, 24, and 26 over the surface of the substrate 16. Each of the tips 20, 22, 24, 26 is scanned across the surface of the substrate along a respective scanning path 42, 44, 46, 48, such as may be oriented in an X-direction. The processor 34 further may control scanning intervals of the probe tips 20, 22, 24, and 26 by adjusting the position of the tips in the Y-direction between each scanning interval. By way of example, the system 10 may include a precise positioning device to effect relative movement between the substrate 16 and the probe tips 20, 22, 24, and 26 for selectively scanning portions of the substrate surface. Each tip 20, 22, 24, 26 may be concurrently scanned in a raster pattern across the surface of the substrate 16 by a suitable positioning system. Alternatively, the substrate 16 may be situated on a precise positioning system, which moves the substrate relative to the probe tips 20, 22, 24, and 26 in a desired raster pattern.

The processor 34 also is programmed and/or configured to analyze the measurement data obtained from the detector system 30 in accordance with an aspect the present invention. The manner in which the processor may be programmed to carry out the functions relating to the present invention will be readily apparent to those having ordinary skill in the art based on the description provided herein. As mentioned above, rastering the probe tips 20, 22, 24, and 26 across the surface of the substrate 16 produces measurement data from which the control system may determine selected feature properties and/or construct a topographic image (e.g., a graphical outline) of the features on the substrate surface with resolution according to the dimensions of the probe tips 20, 22, 24, and 26. An image of the scanned surface or selected aspects thereof also may be directed to the associated display 40 by the control system 32.

By way of example, the processor 34 contains computer-executable instructions for aggregating the measurement data obtained from each probe tip 20, 22, 24, 26 during each scanning interval to construct feature properties. The present invention permits various feature characteristics to be distilled from the measurement data. One particular aspect of the feature relates to the boundaries of the feature 18. In the example of a line feature, each lateral edge of the line defines a boundary, which may vary due to LER. By analyzing the measurement data associated with each of the lateral edges, a graphical construction (e.g., a shape or image) for the data set may be determined to quantify the LER of a feature.

FIGS. 2A–2C illustrate one approach that may be implemented, in accordance with an aspect of the present invention, to obtain measurement data that may be employed to determine LER and/or linewidth information for a feature. Each of FIGS. 2A, 2B, and 2C represent different steps in a data collection/scanning process. As mentioned above with respect to FIG. 1, the probe assembly 28 may include two or more probe tips 20, 22, 24, and 26 that concurrently scan across a substrate and associated surface features. For purposes of simplicity of illustration, FIGS. 2A–2C show an example where four probe tips are employed to scan a feature 18, although it is to be appreciated that any plurality of tips may be utilized in accordance with the present invention.

In FIG. 2A, the probe tips are concurrently scanned in a substantially parallel manner across a first region of the feature 18. An associated arrow 52, 54, 56, 58 extending in the X-direction represents a scanning path for each of the probe tips across the feature 18. While the scanning paths 52, 54, 56, and 58 are illustrated as being substantially evenly spaced during the scanning process, those skilled in the art will appreciate that different spacing between each adjacent pair of the probe tips may be employed. The particular spacing between the respective scanning paths is illustrated for purposes of clarity, as the spacing between scanning paths typically is selected to be less than (.g., about one-half or less than) the spatial frequency of the LER being measured. Moreover, a scanning path other than the linear path shown also could be used.

Additionally, while the illustrated scanning paths 52, 54, 56, 58 are illustrated as being in the positive X-direction, scanning also may occur in the negative X-direction. By way of example, the probe tips may first scan the substrate and features associated therewith in the positive X-direction. After adjusting the tips in the Y-direction, the scanning may then occur back across the feature in the negative X-direction, and so on.

After completion of the scan in FIG. 2A, the position of the probe tips relative to the substrate and feature(s) is adjusted in the Y-direction, which is substantially perpendicular relative to the scanning path. The probe tips raster across the surface of the feature 18 along scanning paths 52', 54', 56', and 58'. In this example, there is no overlap between the scanning interval of FIG. 2A and the interval of FIG. 2B. That is, the probe tips are shifted in the Y-direction an amount at least equal to a distance between the probe tips located at the ends of the probe assembly 28. Consequently, the overall scanning time may be minimized, as a greater surface area may be scanned in given amount of time.

FIG. 2C illustrates a next scanning interval over the feature 18, in which the probe tips have been re-positioned to scan across a next region of the feature. Again, this may be achieved by moving the probe tips an amount at least equal to a distance between the probe tips located at the ends of the probe assembly. In this way, the scanning paths 52", 54", 56", and 58" traverse a new portion of the feature 18 so that there is no overlap between the scanning paths in FIG. 2C and the preceding scanning paths. Because, in this example, there is no overlap between feature areas scanned in each interval and because the spacing between each probe tip is known, the data from each consecutive interval may be appended longitudinally to the data from a preceding interval to facilitate construction of the corresponding feature 18 and further analysis of feature properties.

FIGS. 3A–3D illustrate another approach to obtain measurement data of a feature 18, in accordance with another aspect of the present invention. In contrast to the approach of FIGS. 2A–2C, there is overlap between adjacent scanning intervals of FIGS. 3A, 3B, 3C, and 3D. In particular, in FIG. 3A the probes scan a first region of the feature 18 over scanning paths 60, 62, 64, and 66 in an X-direction in a manner that is similar to the scanning interval of FIG. 2A. That is, a plurality of probes traverse the feature 18 along associated spaced apart scanning paths 60, 62, 64, and 66. Again, while the paths 60, 62, 64, and 66 are illustrated as being linear and substantially parallel, those skilled in the art will understand and appreciate that other path trajectories may be utilized in accordance with the present invention.

After the scanning interval of FIG. 3A, the position of the probe tips are adjusted relative to the feature 18 to enable a next portion of the feature to be scanned over the scanning paths 60', 62', 64', and 66', as illustrated in FIG. 3B. More particularly, the probe tips are moved in the Y-direction that is substantially perpendicular to the scanning paths. Additionally, each of the probe tips are moved an amount that is less than the distance between the probe tips located at the opposed ends of the probe assembly. For example, the probe tips may be shifted a predetermined distance that is less than the distance between the probe tips located at the opposed ends of the assembly. Alternatively, a random distance (which may be selected to be between a range of values) that is less than the distance between the probe tips located at the opposed ends of the assembly may be determined for each scanning interval. In this way, more measurement data may be obtained for the feature 18 from which desired LER and/or linewidth information may be determined.

FIG. 3C illustrates a next scanning interval in which the probe tips are scanned across the feature 18 along scanning paths 60", 62", 64", and 66" to obtain a next set of measurement data. The shifting of the probe tips from the position in the interval of FIG. 3B to the position in the interval of FIG. 3C may occur in accordance with the approach described with respect to FIG. 3B. That is, the shift may be a predetermined distance or a randomly selected distance that is less than the distance between the probe tips located at the opposed ends of the assembly so that there is some overlap between the areas scanned in FIGS. 3B and 3C.

FIG. 3D illustrates a next step in the scanning process in which the probe tips have been shifted in the Y-direction a distance that is less than the distance between the probe tips located at the opposed ends of the assembly. The probe tips scan across the surface of the feature 18 along scanning paths 60''', 62''', 64''', and 66'''. As a result, some overlap may occur between the feature portions scanned in FIGS. 3C and 3D.

In view of the scanning approaches just described (FIGS. 2A–2C and 3A–3D), the measurement data collected from each probe tip approach may be utilized, in a similar manner, to determine information indicative of the LER and/or linewidth of the feature. The measurement data may be aggregated to map feature properties, including boundaries of each scanned feature. Position data for the side edge boundaries of the feature may be extracted from the measurement data for each probe tip in each scanning interval to determine a relative indication of the edge positions of the feature based on the scan performed by each probe tip.

The edge position data for each side of the feature boundary may then be correlated and/or compared to derive quantitative information about the LER for each respective feature boundary. That is, the measurement data for a common feature boundary e.g., a side edge of a line) may be utilized to quantify LER. For example, the measurement data at each feature boundary may be employed to determine an average position for the feature boundary. The measurement data at that boundary may then be compared relative to the average boundary position value to derive an indication of the LER for each scanning path of each probe tip. This process may be repeated for each feature boundary to derive quantitative information about LER for each feature boundary. Additionally or alternatively, a standard deviation also may be computed for the LER relative to mean position of a boundary along the length of the feature.

In accordance with another aspect of the present invention, the determined average position of opposed feature boundaries (e.g., opposed sides of the lines) may be employed to determine an average linewidth of the feature. Moreover, the actual measurement data from each probe tip further may be utilized to determine a more accurate indication of linewidth for a particular part of the feature based on the measurement data along a path scanned by each probe tip. The average linewidth data and/or actual data may then be correlated to provide an indication of linewidth variations for each feature. A standard deviation of the linewidth also may be determined to quantitatively characterize linewidth variations along the length of a feature. The determined feature property information may then be utilized to refine and further develop processing steps so as to mitigate undesirable errors, such as LER and/or linewidth variations.

Figure 4:
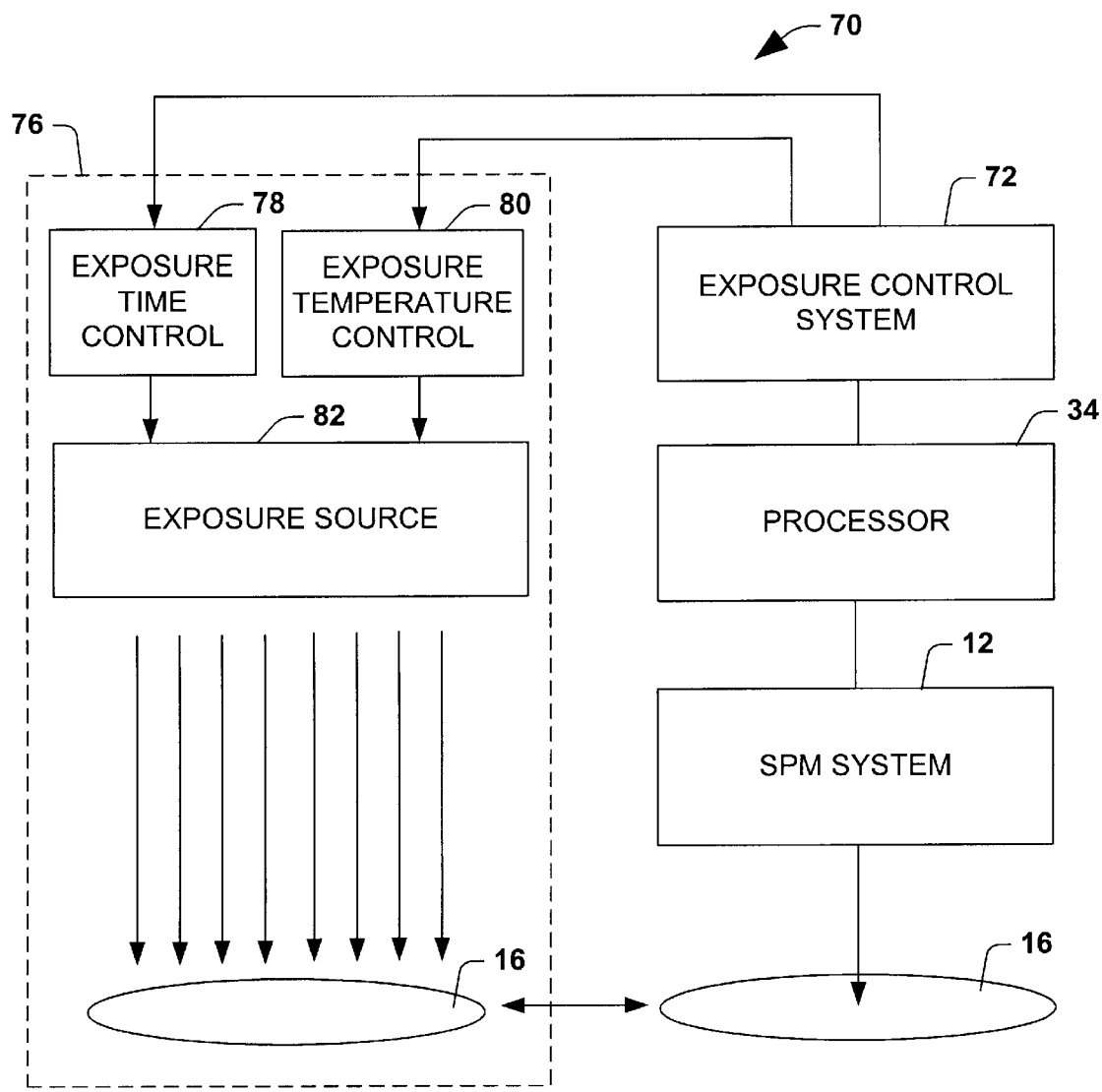
FIG. 4 is a schematic diagram of a scanning system and a control feedback system for eliminating a line edge roughness in a photoresist feature in accordance with the present invention.

In accordance with yet another aspect of the present invention, a system for ascertaining LER associated with a developed PR feature and controlling a re-work operation in accordance therewith to reduce the LER is disclosed, as illustrated in FIG. 4 and designated at reference numeral 70. The system 70 comprises a scanning probe microscope system such as the system 12 of FIG. 1 along with a processor 34 to ascertain a LER associated with a photoresist feature residing on a developed wafer 16. Such a determination may be made in accordance with the discussion highlighted above, for example. The system 70 further comprises an exposure control system 72 operably coupled to the processor 34. The exposure control system 72 is configured or otherwise operable to generate one or more exposure control signals 74 in response to the LER data from the processor 34, wherein the exposure control signals are related to the LER. The control system 72 is further operable to transmit such signals to an exposure system 76, for example, associated with a stepper system.

Still referring to FIG. 4, the exposure system 76 comprises, for example, an exposure time control module 78, an exposure temperature control module 80 and an exposure source 82. The exposure system 76 is operable to receive the exposure control signals 74 and control an exposure time and temperature of a blanket exposure of the post developed wafer 16 via the exposure source 82. That is, after the wafer 16 is analyzed by the system 12 and the processor 34 to ascertain the LER of the developed photoresist, the photoresist feature(s) are then re-worked using the exposure system 76 by subjecting the wafer 16 to a blanket exposure. The blanket exposure has a duration and temperature which is associated with the determined LER (via the exposure control signals 74) such that the blanket exposure reduces the LER of the photoresist. More particularly, the subsequent blanket exposure (e.g., a variable time, deep UV exposure at a temperature of about 70–100° C.) is not sufficiently intense to cause a reflow of the resist, but does operate to alter the chemistry of the photoresist, thereby causing edges of the photoresist feature to pull back due to surface tension, which reduces the LER of the photoresist feature.

In view of the structure and operation described above, methodologies that may be employed in accordance with the present invention will be described with respect to FIGS. 5 and 6. While, for purposes of simplicity of explanation, the methodologies are shown and described as a series of steps, it is to be understood and appreciated that the present invention is not limited by the order of steps, as some steps may, in accordance with the present invention, occur in different orders and/or concurrently with other steps from that shown and described herein. Moreover, not all illustrated steps may be required to implement a methodology in accordance with an aspect the present invention.

Figure 5:
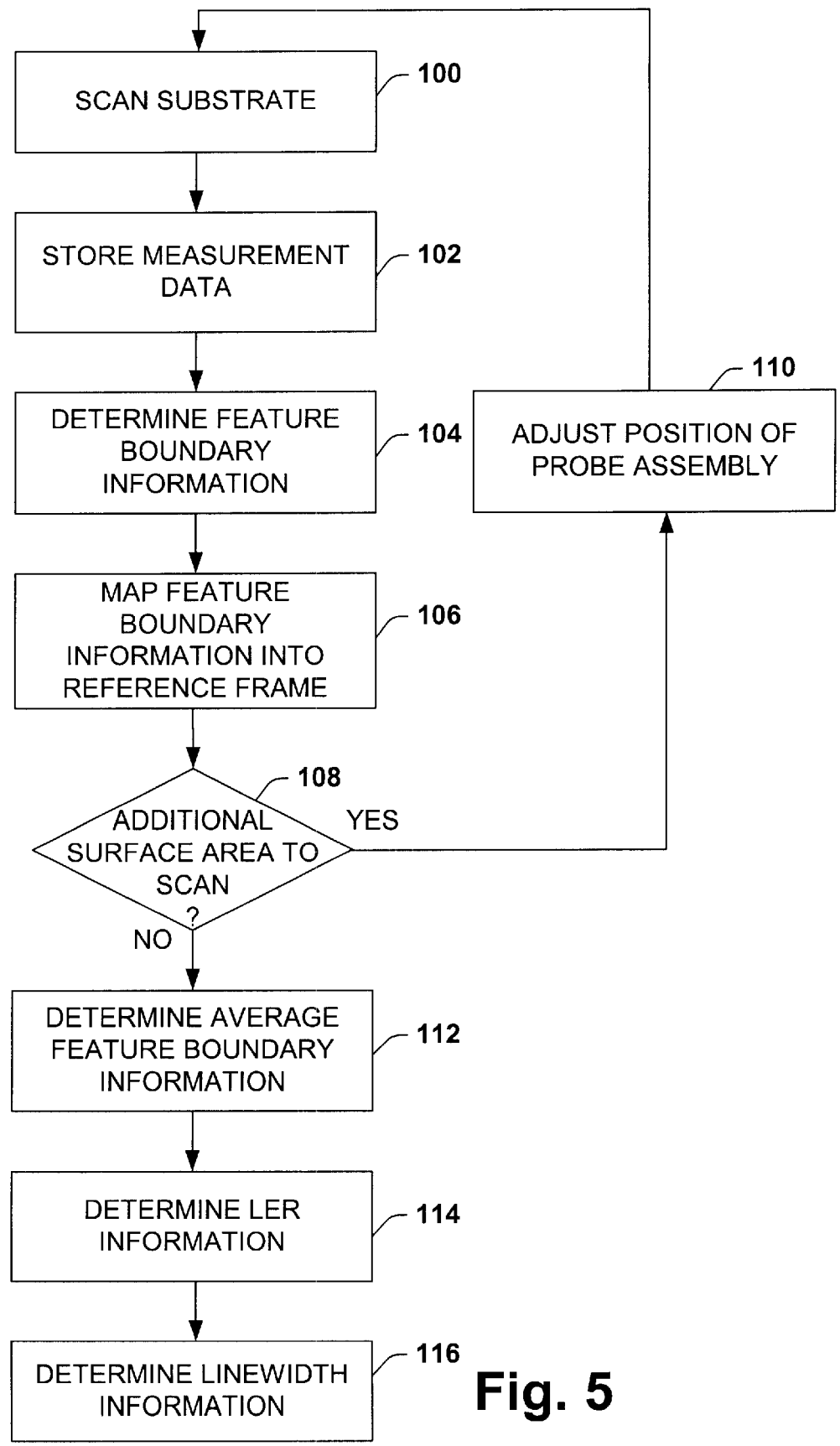
FIG. 5 is a flow diagram illustrating a scanning and analysis methodology in accordance with the present invention.

Referring to FIG. 5, a flow diagram of a methodology for determining feature properties is illustrated in accordance with an aspect of the present invention. The process begins at step 100, in which a scan is made over the substrate with a plurality of probe tips traversing the substrate and features located thereon over associated scanning paths. Movement of the probe tips relative to the substrate is sensed to provide measurement data indicative of the topographical substrate properties encountered by each probe tip. From step 100 the process proceeds to step 102.

At step 102 the measurement data is stored in appropriate memory to enable analysis and processing of the measurement data. Next, at step 104, feature boundary information is determined from the stored measurement data. The feature boundary information, for example, may include a relative position of each boundary (e.g., the edges of each feature) that is scanned by each probe tip during the scanning interval at step 100. Next at step 106, the feature boundary information is mapped into a reference frame. That is, the feature boundary information for the substrate may be normalized with respect to a reference plane to facilitate processing of measurement. From step 106, the process proceeds to step 108, in which a determination is made as to whether there is any additional surface area to scan on the substrate. If additional surface area is to be scanned does exist, the process proceeds to step 110 in which the position of the scanning probes is adjusted. The probe tips may be adjusted in different manners. For example, the probe tips may be adjusted so that there is little or no overlap of the surface scanned by the probes during subsequent scanning intervals. Alternatively, the probe tips may be adjusted a distance that is less than the distance between the probe tips located at opposite ends of probe tip assembly. The adjustment distance may be a predetermined amount between each scanning interval or the distance may be randomly selected as a function of the distance of between probe tips located at the ends of the probe tip assembly.

By way of example, the probe assembly may be adjusted a distance that is an incremental portion of the distance between an adjacent pair of the plurality of probes. After adjusting the probe tip assembly during a plurality of scanning intervals so that the assembly has been move a total distance during plurality of scanning intervals that is about equal to the distance between the adjacent pair of probes, the entire assembly is then adjusted a greater distance approximately equal to the distance between the probe tips located at opposite ends of probe tip assembly. From step 110, the process returns to step 100 in which the foregoing steps 100–106 are repeated based on measurement data obtained during another scanning interval.

If the determination at step 108 is negative, indicating that the entire substrate or a desired area of the substrate has been scanned, the process proceeds to step 112. At step 112, average feature boundary information is determined based on the stored measurement data and/or the determined feature boundary information. The average feature boundary information, for example, may include the average relative position of a selected feature boundary based on the measurement data for each of the probe tips during each of the scanning intervals. The average feature boundary information provides a basis from which variations in the feature boundary may be determined. The average feature boundary information may be determined for each feature boundary. That is, a relative position for each edge of a feature may be determined as a function of the measurement data associated with each boundary. The average feature boundary information further may be utilized to construct an average representation of a feature. From step 112 the process proceeds to step 114.

At step 114, line edge roughness (LER) information is determined. The LER information, for example, may be determined as a function of the measurement data obtained from each probe tip during each of the scanning intervals. In addition, the LER information for each probe tip during each scanning interval may be determined relative to the average value of the feature boundary so as to provide an indication of the edge of the feature relative to an average value of that line edge or other feature boundary. In addition, the measurement data obtained from each probe tip during each measurement interval may be correlated to determine the maximum and minimum variations in the position of an edge of a line feature so that another determination may be made as to whether the variation is outside an expected or an acceptable range of values. Moreover, a standard deviation of the LER also may be determined for each boundary of the feature relative to a computed mean value thereof to characterize the LER of each feature.

From step 114 the process proceeds to step 116 in which linewidth information is determined. Linewidth information may be determined as a function of the average feature boundary information that was determined at step 112. For example, the linewidth may be determined based on a difference between the average feature boundary values at opposite side edges of a feature. In accordance with another aspect, the linewidth may be determined directly from the measurement data. For example, the linewidth may be determined as the difference between the relative position values for opposed side edges of a feature boundary. This linewidth determination may be determined with respect to measurement data provided by each probe tip during a corresponding measurement interval.

Figure 6:
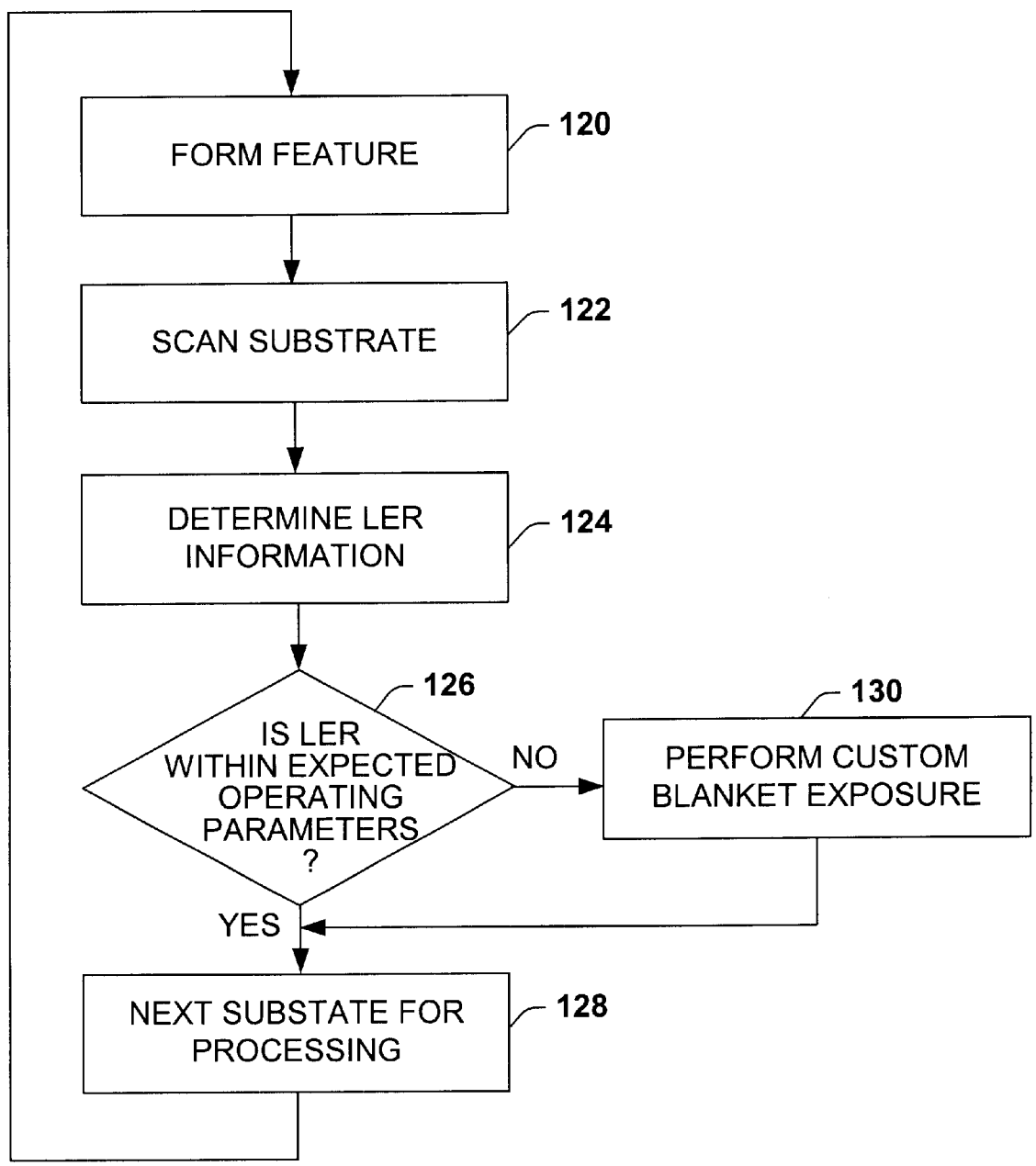
FIG. 6 is a flow diagram illustrating a methodology for forming features having reduced line edge roughness in accordance with the present invention.

FIG. 6 illustrates a methodology that may be implemented to form features having reduced line edge roughness in accordance with an aspect of the present invention. The methodology begins at step 120 in which one or more features are formed on a substrate. By way of illustration, this step may be a multi-step process, such as may include several well known semiconductor processing techniques, such as coating, exposure, developing, etching, thermal baking, and/or flood exposure. Because such processes are well known in the art, details concerning such steps have been omitted for purposes of brevity.

Briefly stated, a radiation-sensitive film (e.g., a resist coating) is coated onto a selected substrate, such as by spin coating. A lithographic process utilizes an exposure source (e.g., optical light, x-rays, or an electron beam) that illuminates selected areas of the film coating through an intervening master template (e.g., a mask or reticle) to transfer a desired pattern to the coating. More soluble areas of the coating are then removed in a developing process to leave the pattern image in the coating as less soluble polymer. The remaining resist forms a hard mask which may be employed in a suitable etching process to form desired features in the substrate or a layer which has been disposed thereon.

It further may be desirable to thermally bake the substrate and resist for a selected duration at one or more stages in the process, such as, for example, pre-exposure baking, post-exposure baking, and/or post-developing baking. Each baking stage occurs at a selected temperature (e.g., from about 100° to about 140° C.) for a selected duration. Post-developing baking may cause the resist to reflow at the edges. By selectively controlling the level of reflow (e.g., based on the baking temperature and/or baking duration), the edges of the remaining pattern and the resulting pattern formed by etching becomes more smooth.

Additionally or alternatively, the feature formation process (step 120) may include a flood exposure step in which the substrate and visible layers are exposed to a shower of light having a plurality of wavelengths, such as from about 250 to about 1000 nm for a selected duration. The flood exposure serves a dual purpose. First, some wavelengths of light interact with the resist, causing reflow of the resist, which tends to smooth out the resist at its edges. Second, other wavelengths of light in the flood exposure interact with the surface of the resist coating, causing crosslinking of polymers in the resist, thereby increasing the surface hardness of the resist.

Referring back to FIG. 6, after the feature has been formed, such as may correspond to one or more layers being formed at the substrate, the process proceeds to step 122. At step 122, the surface of the substrate, which includes features formed thereon, is scanned. The scanning, for example, may be performed with a suitable scanning probe microscope (SPM), such as shown and described herein. It is to be understood and appreciated that other scanning methodologies also may be utilized in accordance with the present invention. The process then proceeds to step 124.

At step 124, LER information about one or more features formed on the substrate is determined. The process of determining LER information, for example, may occur in a manner similar to that described with respect to FIG. 5. After the LER information has been determined, the process proceeds to step 126.

At step 126, a determination is made as to whether the LER is within expected operating parameters. If the LER information is within expected, acceptable operating parameters, the process proceeds to step 128. At step 128, another substrate is provided for processing in substantially the same manner as just described with respect to steps 120–126.

If the determination at step 126 is negative, indicating that the LER is not within expected operating parameters (e.g., LER exceeds a threshold LER value), the process proceeds to step 130. At step 130, a customized blanket exposure step is implemented in which one or more operating characteristics of a blanket exposure (e.g., exposure time, exposure temperature) are adjusted as a function of the LER information. By way of illustration, step 130 may include adjusting one or more operating characteristics (e.g., temperature and/or duration) of one or more of the thermal baking steps of the process as a function of the determined LER information. Additionally or alternatively, one or more operating characteristics (e.g., exposure duration and/or wavelengths of light) of a flood exposure step may be modified based on the determined LER information.

From step 130, the process proceeds to step 128 to process another substrate, utilizing the adjusted operating characteristics in the feature formation process. Accordingly, such operating characteristics may be refined based on the LER information (step 124) over several processing iterations until a desired level of LER is achieved. In this way, the methodology is able to adapt process controls in response to undesirable LER variations so as to increase throughput and mitigate errors that might otherwise occur due to features having excessive LER.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described components (assemblies, devices, circuits, etc.), the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention may have been disclosed with respect to only one of several embodiments, such feature may be combined with one or more other features of the other embodiments as may be desired and advantageous for any given or particular application. Furthermore, to the extent that the term "includes" and variants thereof or the term "having" and variants thereof are used in the detailed description and/or the claims, such term is intended to be inclusive in a manner similar to the term "comprising."

What is claimed is:

1. A system for determining properties of a feature located at a surface of a substrate, comprising:
   a scanning system having a plurality of probe tips operable to traverse a surface of the substrate, wherein each probe tip extends from an associated cantilever arm, which arms are connected to a common scanning arm, and wherein each probe tip providing measurement data indicative of topographical features scanned thereby; and
   a control system operable to receive the measurement data, the control system aggregating measurement data from the plurality of probe tips during multiple scanning intervals to determine feature properties based on the aggregated measurement data, wherein the feature properties include line edge roughness of a line feature located at the surface of the substrate, which is determined as a function of the measurement data associated with a common boundary.

2. The system of claim 1, wherein the control system is further adapted to adjust a position of the probe tips between each scanning interval in a direction substantially perpendicular to a scanning path of the probe tips.

3. The system of claim 2, wherein the position of the probe tips between each scanning interval is adjusted an adjustment distance that is less than a distance between probe tips located at opposite ends of the plurality of probe tips.

4. The system of claim 3, wherein the adjustment distance is less than a distance between an adjacent pair of the plurality of probe tips.

5. The system of claim 1, wherein the line edge roughness is determined as a function of measurement data associated with the common boundary relative to an average position value at the common boundary.

6. The system of claim 1, wherein the feature properties include linewidth of a line feature located at the substrate, which is determined as a function of the measurement data associated with opposed boundaries of the line feature.

7. A system for determining properties of a feature located at a surface of a substrate, comprising:
   a scanning system having a plurality of probe tips operable to traverse a surface of the substrate, each probe tip providing measurement data indicative of topographical features scanned thereby; and
   a control system operable to receive the measurement data, the control system aggregating measurement data from the plurality of probe tips during multiple scanning intervals to determine feature properties based on the aggregated measurement data, wherein the topographical features comprise photoresist features, the system further comprising:
      an exposure control system operably coupled to the control system; and
      an exposure system operably coupled to the exposure control system,
      wherein the exposure control system is operably to generate one or more exposure control signals based on the determined feature properties from the control system, and wherein the exposure system is operable to provide an exposure condition based on the one or more control signals for exposing the photoresist features.

8. The system of claim 7, wherein the determined feature properties comprise an edge roughness of the photoresist features.

9. The system of claim 8, wherein the exposure condition comprises a blanket exposure having a predetermined duration at a predetermined temperature based on the edge roughness of the photoresist features.

10. The system of claim 9, wherein the predetermined duration and predetermined temperature are uniquely associated with the edge roughness of the photoresist features.

11. A system to determine properties of a feature disposed on a substrate in combination with a semiconductor processing system, the combination comprising:
    a plurality of scanning means for scanning a surface of the substrate and providing measurement data indicative of topographical features of the substrate;
    control means for controlling operation of each of the plurality of scanning means and receiving the measurement data therefrom;
    means for aggregating measurement data from the plurality of scanning means during multiple scanning intervals to determine selected feature properties based on the aggregated measurement data;
    means for determining line edge roughness of a line feature located at the surface of the substrate as a function of the measurement data associated with a common boundary of the line feature; and
    the semiconductor processing system comprising:
       process means for forming the features on the substrate; and
       process control means for adjusting operating characteristics associated with the process means as a function of the determined line edge roughness, thereby mitigating line edge roughness for subsequently formed features.

12. A method for determining properties of a feature located at a surface of a substrate, comprising the steps of:
    employing a plurality of probe tips to scan the surface of the substrate;
    adjusting a position of the probe tips between each consecutive scanning interval;
    storing measurement data for each probe tip during each scanning interval;
    aggregating measurement data associated with a feature; and
    determining feature properties as a function of the aggregated measurement data associated with the feature, wherein the feature is a line, the step of determining further including determining an indication of line edge roughness of the line feature as a function of the aggregated measurement data associated with a common boundary of the line feature; and
    controlling at least one operating characteristic associated with a subsequent step of forming a feature on a substrate as a function of the determined line edge roughness so as to mitigate line edge roughness in features formed in subsequent steps of forming.

13. The method of claim 12, wherein the step of determining further includes determining the line edge roughness of the line feature as a function of measurement data associated with the common boundary relative to an average position value of the common boundary.

14. The method of claim 12, wherein the step of adjusting further includes adjusting the position of the probe tips between each scanning interval in a direction substantially perpendicular to a scanning path of the probe tips.

15. The method of claim 14, wherein the step of adjusting further includes adjusting the position of the probe tips between each scanning interval an adjustment distance that is less than a distance between probe tips located at opposite ends of the plurality of probe tips.

16. The method of claim 15, wherein the adjustment distance is less than a distance between an adjacent pair of the plurality of probe tips.

17. A semiconductor manufacturing process comprising the steps of:

forming a feature on a substrate;

scanning the surface of the substrate, including the feature;

determining an indication of edge roughness for the feature;

performing a blanket exposure step for the feature, wherein the blanket exposure is a function of the edge roughness determination, wherein the blanket exposure reduces the edge roughness of the feature.

18. The process of claim 17, wherein the step of performing the blanket exposure further includes exposing the feature to radiation at a predetermined temperature for a predetermined period of time, wherein the predetermined temperature and the predetermined period of time are a function of the edge roughness determination.

19. The process of claim 17, wherein the step of performing the blanket exposure of the feature comprises adjusting an operating characteristic of the blanket exposure as a function of the determined edge roughness.

* * * * *

UNITED STATES PATENT AND TRADEMARK OFFICE
CERTIFICATE OF CORRECTION

PATENT NO.   : 6,516,528 B1
DATED        : February 11, 2003
INVENTOR(S)  : Bryan K. Choo and Bhanwar Singh It is certified that error appears in the above-identified patent and that said Letters Patent is hereby corrected as shown below:

<u>Column 7,</u>
Lines 13 and 14, please replace the numbers "52', 54', 56', and 58'" with the numbers -- 52, 54, 56, and 58 --.

Signed and Sealed this

Twenty-fifth Day of March, 2003

JAMES E. ROGAN
*Director of the United States Patent and Trademark Office*